United States Patent [19]
Goldman et al.

[11] Patent Number: 6,036,094
[45] Date of Patent: Mar. 14, 2000

[54] HAND-HELD OPTICAL SCANNER FOR READING TWO-DIMENSIONAL BAR CODE SYMBOLS AND THE LIKE

[75] Inventors: Ron Goldman, Cold Spring Harbor, N.Y.; Peter Wyatt, Los Angeles, Calif.; Steven Chew, East Northport; Peter Fazekas, Bayport, both of N.Y.

[73] Assignee: Symbol Technologies, Inc., Holtsville, N.Y.

[21] Appl. No.: 08/874,827

[22] Filed: Jun. 13, 1997

[51] Int. Cl.[7] .................................................. G06K 7/10
[52] U.S. Cl. .................................. 235/462.45; 235/462.2
[58] Field of Search ........................ 235/462.45, 472.01, 235/462.13, 462.2, 462.43; 345/158, 163, 164, 165

[56] References Cited

U.S. PATENT DOCUMENTS

| | | | |
|---|---|---|---|
| 2,980,319 | 4/1961 | Clemens et al. | 234/30 |
| 4,581,761 | 4/1986 | Ichinokawa et al. | 382/13 |
| 4,818,978 | 4/1989 | Kurihara et al. | 340/706 |
| 4,984,287 | 1/1991 | Massoudi | 382/59 |
| 5,227,909 | 7/1993 | Watson | 359/196 |
| 5,311,208 | 5/1994 | Burger et al. | 345/163 |
| 5,633,489 | 5/1997 | Dvorkis et al. | 235/472 |
| 5,656,804 | 8/1997 | Barkan et al. | 235/472 |
| 5,744,788 | 4/1998 | Metlitsky et al. | 235/454 |
| 5,814,804 | 9/1998 | Kostizak | 235/472 |

*Primary Examiner*—Donald Hajec
*Assistant Examiner*—Daniel H. Sherr
*Attorney, Agent, or Firm*—Gary Serbin

[57] ABSTRACT

A lightweight, easy to grasp and manipulate hand-held optical scanning device for scanning and digitizing image data from a two-dimensional bar code symbol for subsequent decoding in a personal computer platform. The scanning device achieves a small footprint in the user's workspace by utilizing a non-folded, substantially vertical optical path extending from an image viewing area upwardly to a linear charge-coupled device (CCD) array upon which the successive rows of the target two-dimensional bar code symbol are imaged. The scanning device is easily aligned with the symbol by placing it behind the symbol, and scanning of the successive rows of the symbol is accomplished by swiping or rolling the scanning device towards the user. Mechanical rollers on the underside of the scanning device provide translation information for use in clocking data out of the linear CCD array in order to scan the successive rows of the two-dimensional bar code symbol. The operating environment of the computer allows scanning to be initiated by the user without having to use the keyboard or mouse peripheral. As the two-dimensional bar code symbol is being scanned, digitized image data is automatically and in real time ported to a symbol decoding application running in the background, and decoded data from the decoding application is ported into the application the user is running in the foreground. A trackball and a pair of select buttons are optionally provided on the scanning device for mouse emulation, thereby eliminating the need for a separate mouse peripheral device.

12 Claims, 10 Drawing Sheets

HAND-HELD OPTICAL SCANNER FOR READING TWO-DIMENSIONAL BAR CODE SYMBOLS AND THE LIKE

This application claim the benefit of U.S. Provision Application No. 60/019,789, filed Jun. 4, 1996.

BACKGROUND OF THE INVENTION

1. Field of the Invention

This invention relates to a hand-held device for scanning two-dimensional bar code symbols and the like.

2. Description of Related Art

Bar codes have become broadly accepted as a means for automatically identifying objects. A bar code symbol is a pattern of parallel bars and spaces of various widths that represent data elements or characters. The bars represent strings of binary ones and the spaces represent strings of binary zeros. Generally, the bars and spaces can be no smaller than a specified minimum width which is called a "module" or "unit." The bars and spaces are multiples of this module size or minimum width.

The conventional bar code symbol is "one-dimensional" in that the bars and spaces extend only in a single direction. There has been an increasing need, however, for machinereadable symbols that contain more information than conventional bar code symbols. One approach for increasing the information in machine-readable symbols is to reduce the height of the bar codes and stack the bar codes one on top of each other to create a "stacked" or "two-dimensional" bar code. One such two-dimensional bar code is PDF417, which was developed by Symbol Technologies, Inc. The PDF417 symbology utilizes a variable number of codewords which are discrete representations of data. A complete description of the PDF417 code is contained in U.S. Pat. No. 5,304,786, which is assigned to the same assignee as the present invention and which is incorporated by reference herein. Other two dimensional bar code symbologies include Code 1 and Maxicode, which are referred to as matrix codes.

Both one-dimensional and two-dimensional bar code symbols are typically read by optical scanning techniques, such as by mechanically scanned laser beams or by self-scanning charge-coupled devices (CCD's), and the resulting electrical signals are then digitized and decoded to recover the data encoded in the symbol. In particular, two-dimensional bar code symbols such as those in PDF417 symbology may be scanned, either a stationary two-dimensional CCD array or by a linear (one-dimensional) CCD array. When a two-dimensional CCD array (e.g. 512 elements by 512 elements) is used, the array is stationary with respect to the symbol since it can capture the entire surface area of the symbol with one exposure; the stored charge relating to the amount of light reflected from the symbol is shifted out of the CCD array in serial format on a line-by-line basis in accordance with techniques well known in the art.

In order to scan a two-dimensional bar code symbol with a reader utilizing a linear or one-dimensional CCD array, the two-dimensional symbol and the linear CCD array must be put into motion relative to each other. That is, since a linear CCD array is capable of scanning in only one direction, it will only scan across the two-dimensional symbol. By physically moving or "swiping" the reader down the symbol (or vice-verse), the linear CCD array will scan each successive line of the two-dimensional symbol such that the entire symbol will be imaged. The image data can then be digitized and decoded in accordance with means known in the art. A twodimensional bar code reader which utilizes a linear CCD array to operate in this fashion is the PDF120 CCD Scanner marketed by the assignee of the present invention. The PDF120 CCD Scanner has digitizing circuitry and decoding software algorithms contained within the unit and outputs decoded PDF417 data to an RS-232 serial data port.

Other types of hand-held CCD scanning devices well known in the art include optical page scanners, which interface with a computer via a serial data port. Page scanners are used to scan text for input into an optical character recognition (OCR) software algorithm so that a user may scan a text document and have the computer convert the scanned image into text for use with a word processing program or similar application. Page scanners are also usefuil in capturing and storing a purely graphic image. Typically, page scanners require the user to manually adjust the contrast level of the scanner by means of trial and error.

Both the swipe-type PDF417 reader and the page scanning devices of the prior art have disadvantages, in particular when the reading device is used in conjunction with a personal computer in a desktop or so-called "office automation" environment. Both types of readers present large "footprints", i.e. they require a large mount of desk space. This is not only disadvantageous when the device is not in use, but it is also cumbersome when the device is used for scanning. In addition, both types of reading devices require the user to drag the device across the target symbol; thus, prior to scanning, the scanner physically covers the symbol and the user cannot see the symbol prior to initiating scanning. Since alignment of the reader with the symbol is critical. the inability to see the symbol for proper all,iiment is highly undesirable.

In addition, optical scanning devices in the prior art utilize a folded optical path from the viewing area to the CCD array sensor. The typical optical scanner is configured in a wand-type housing, with a handle that is held in the palm of the user's hand attached to a head which is swiped over the target symbol. Typically, a mirror or mirrors are used to reflect the image from the viewing area towards the CCD sensor. The use of mirrors introduce optical losses in the optical path due to various factors known in the prior art, and are thus disadvantageous.

It is therefore an object of the present invention to provide a hand-held two-dimensional bar code symbol reading device which overcomes these and other disadvantages of the prior art.

It is a further object of the present invention to provide such a hand-held two-dimensional bar code symbol reading device which allows the user to easily see the bar code symbol while aligning the reading device prior to scanning.

It is a further object of the present invention to provide such a hand-held two-dimensional bar code symbol reading device which leaves a small footprint on a user's desktop or other working area.

It is a farther object of the present invention to provide such a hand-held two-dimensional bar code symbol reading device which has a straight and mirrorless optical path from the viewing area to the CCD sensor array.

SUMMARY OF THE INVENTION

In accordance with these and other objects, provided is a lightweight, easy to grasp and manipulate hand-held optical scanning device for scanning and digitizing image data from a two-dimensional bar code symbol for subsequent decoding in a host computer, wherein the two-dimensional bar code si is encoded with data and comprises of different light reflectivity. The scanning device comprises a housing configured to be easily grasped by the hand of a user, the housing comprising roller means on a bottom portion thereof for allowing the optical scanning device to be placed on a substrate and rolled towards a user. The scanning device also comprises a symbol illumination window located on the bottom portion of the housing and symbol illumination means located within the housing for providing illumination through the symbol illumination window and onto the symbol. A linear photosensor array for capturing thereon an image of at least part of the bar code symbol and producing analog waveforms with amplitudes poportional to the relative positions of the areas of diferent light reflectivity of the bar code symbol, the array being positioned within the housing at an area located substantially over the symbol illumination window such that a substantially vertical optical path is defined by the symbol illumination window and the photosensor array. Coupled to the roller are means for detecting rotation of the roller means and for controlling the photosensor array to output successive analog waveforms at predetermined intervals of rotation. The scanning device further comprises digitizing means for processing the analog waveforms and producing digital bar patterns corresponding thereto, and means for transmitting the digital bar patterns to a host computer. The digital bar patterns are subsequently decoded by the host computer to produce a data file corresponding to the data encoded in the two-dimensional bar code symbol.

BRIEF DESCRIPTION OF THE DRAWINGS

FIG. 6 is a schematic of the digitizer circuit shown in FIG. 5;

FIG. 14 is an illustration of a card swiping tray utilized in conjunction with the preferred embodiment hand-held scanning device for reading two-dimensional bar code symbols printed on business cards and the like.

DETAILED DESCRIPTION OF THE PREFERRED EMBODIMENTS

Figure 1:
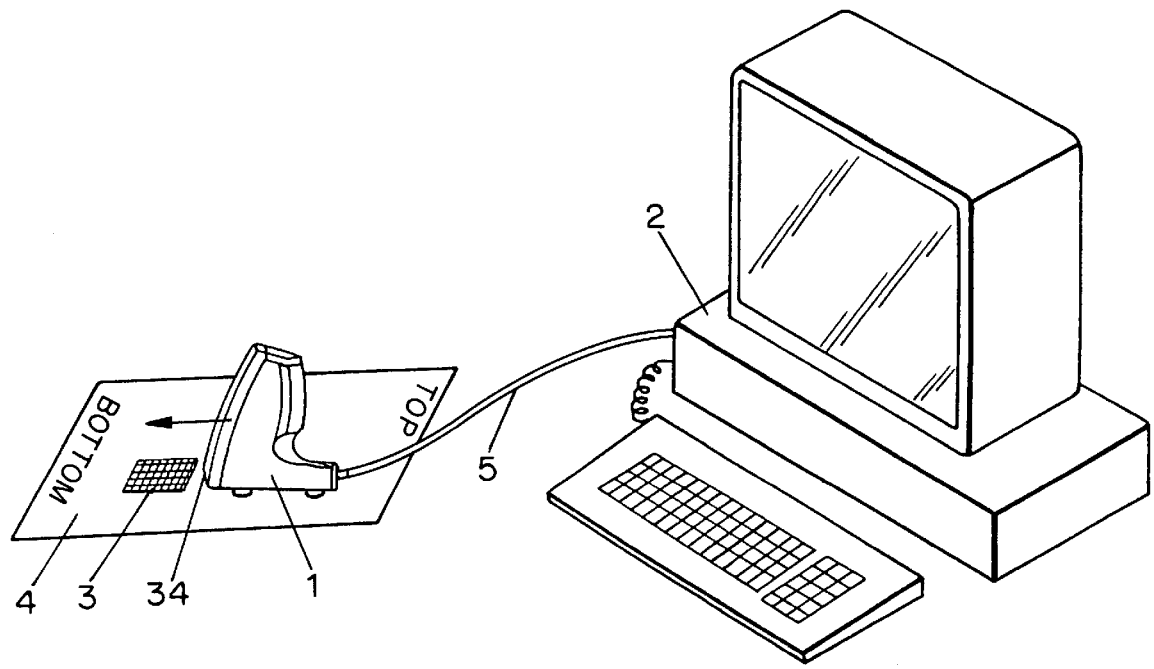
FIG. 1 is an illustration of the preferred embodiment hand-held scanning device of the present invention used in conjunction with a personal computer for scanning a two-dimensional bar code symbol.
Figure 2:
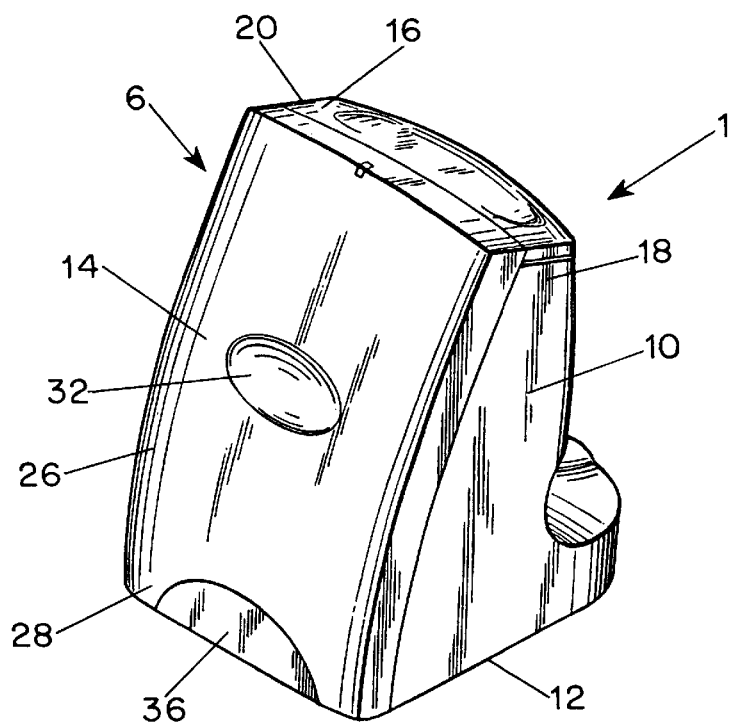
FIG. 2 is a perspective view of the scanning device of FIG. 1.

The preferred embodiment of the present invention will now be described in detail. FIGS. 1 and 2a illustrate a compact, lightweight, hand-held device 1 for scanning one-dimensional and two-dimensional bar code symbols such as those in the PDF417 symbology. Although the preferred embodiment hand-held scanner is illustrated in conjunction with PDF417 symbols, its use is not limited thereby and it can be advantageously adapted to reading any type of two-dimensional or one-dimensional bar code symbol by means well known in the art.

The scanner 1 is designed to fit comfortably and easily within the grasp of the user's hand in order to be aligned with a PDF417 symbol 3 printed on a substrate 4 for scanning and subsequently inputting into a desktop or personal computer 2 for processing and the like. The user's middle, ring, and pinkie fingers fit easily and naturally around the rear of the scanner 1 while the thumb rests within a recess 32 on the front of the scanner and the index finger rests atop a platform 16. The platform 16 is upwardly biased and is associated with an internal activation switch so that the user may exert a slight downwards force on the platform 16 in order to activate the scanner 1 when desired.

The user first aligns the front edge 34 of the scanner 1 to be parallel to the top edge of the PDF417 symbol 3 and then activates the scanner 1 by depressing the platform 16. The user then slowly rolls the scanner 1 over the symbol 3 and towards himself, at all times being able to see the unscanned remaining rows of the symbol 3 and thus easily maintain alignment between the front edge 34 and the rows of the symbol 3. After the symbol 3 has been completely scanned, the user deactivates the scanner 1 by lifting his finger off the platform 16.

The scanner 1 communicates with the computer 2 via a cable 5 is connected to the scanner 1 at the rear thereof When the user scans the symbol 3 by rolling the scanner 1 towards himself, the cable 5 is likewise pulled and simply follows along with the motion of the scanner 1. Thus, the cable is never in the line of scanning and advantageously does not impede scanning of the symbol 3. In contrast, prior art scanners provide interface cabling in the front of the scanner, which tends to impede scanning of the symbol 3.

The construction of the scanner 1 of the present invention will now be described in detail. Scanner 1 is comprised of a housing 6, an inner mounting frame 54, and a gear assembly 58. The housing 6 of the scanner 1 comprises and is assembled from four portions: a main grasping portion 10, a bottom 12, a front panel 14, and a platform 16. The main grasping portion 10 comprises a pair of oppositely disposed side surfaces 18, 20 which are substantially L-shaped and which are joined by an outwardly bowing rear surface 22. A C-shaped surface 24 begins at a lower end of the rear surface 22, curves first inwardly and then back outwardly to meet a lower rear surface 26. Main grasping portion is advantageously and ergonomically configured in order to allow the user to easily grasp it by placing the middle, ring and pinkie fingers of either hand along the rear surface 22 and the C-shaped surface 24.

The platform 16 adjoins the side surfaces 18, 20 and the rear surface 22 of the main grasping portion 10 in a slightly curved fashion, thus allowing easy placement by the user of the index finger. The platform 16 is movably biased in a vertical direction and communicates with an internal switch for activating and deactivating the operation of the scanner 1 as will be described below. The user thus rests his index finger on the platform 16 and depresses the platform 16 downwardly when it is desired to initiate scanning.

Figure 3:
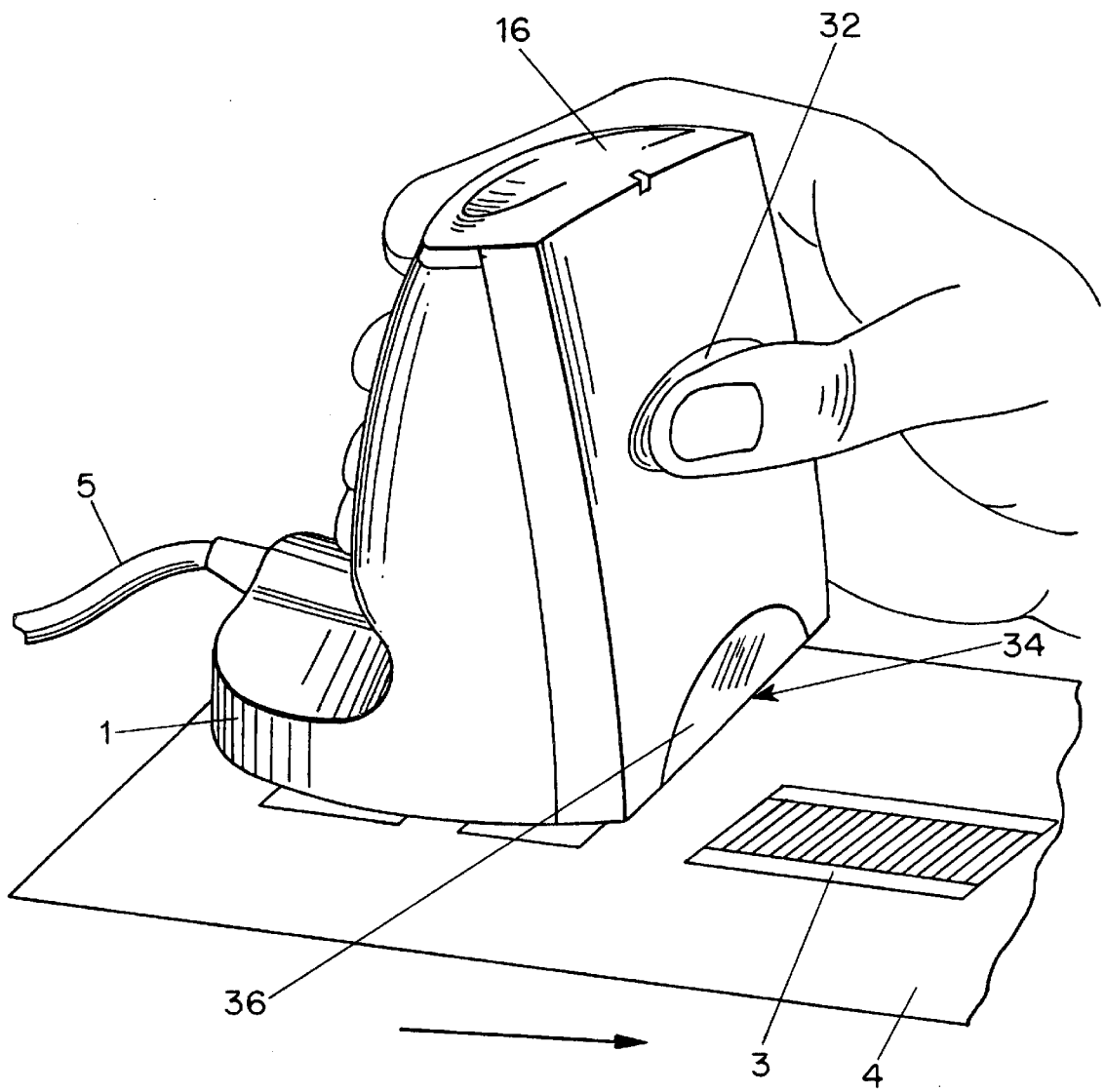
FIG. 3 is a perspective view of the scanning device of FIG. 1 being grasped and used by a user for scanning a bar code symbol.
Figure 4:
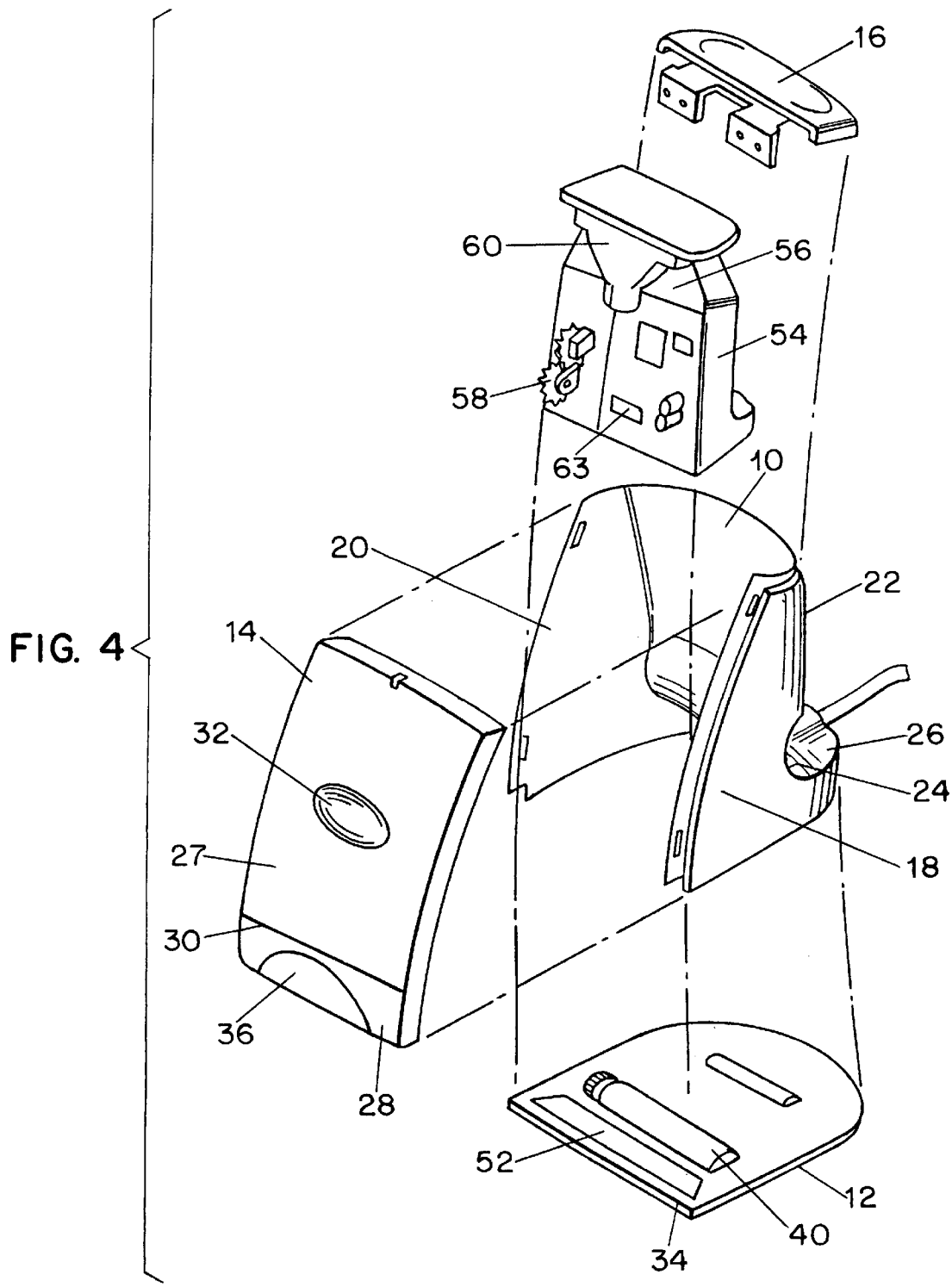
FIG. 4 is a perspective exploded view of the scanning device of FIG. 1.
Figure 5A:
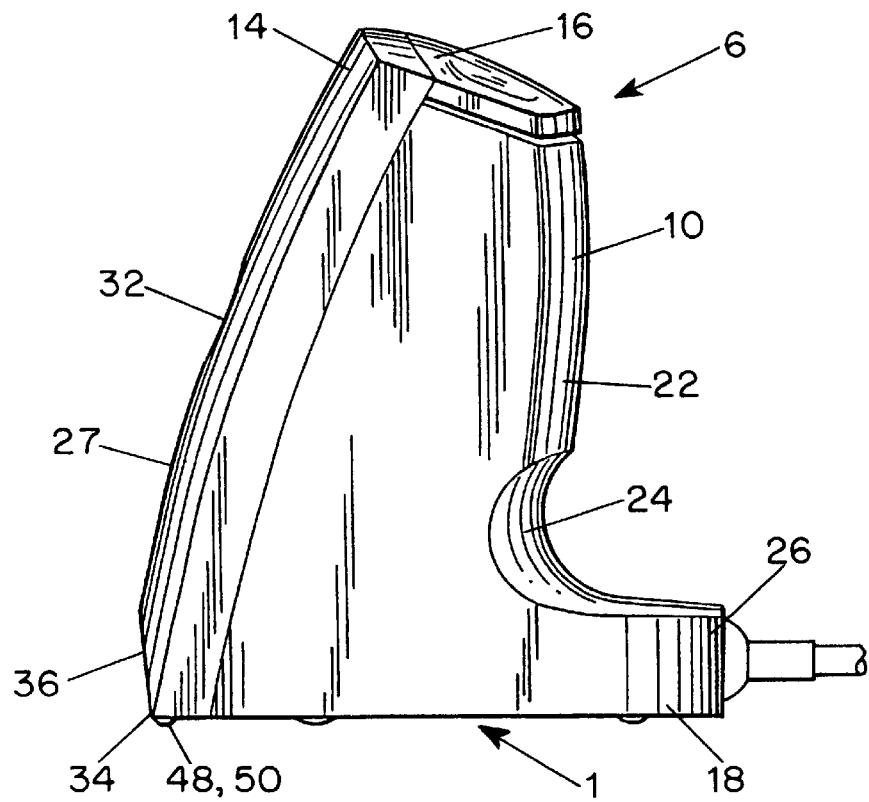
FIG. 5a and 5b are side plan views of the scanning device of FIG. 1.
Figure 5B:
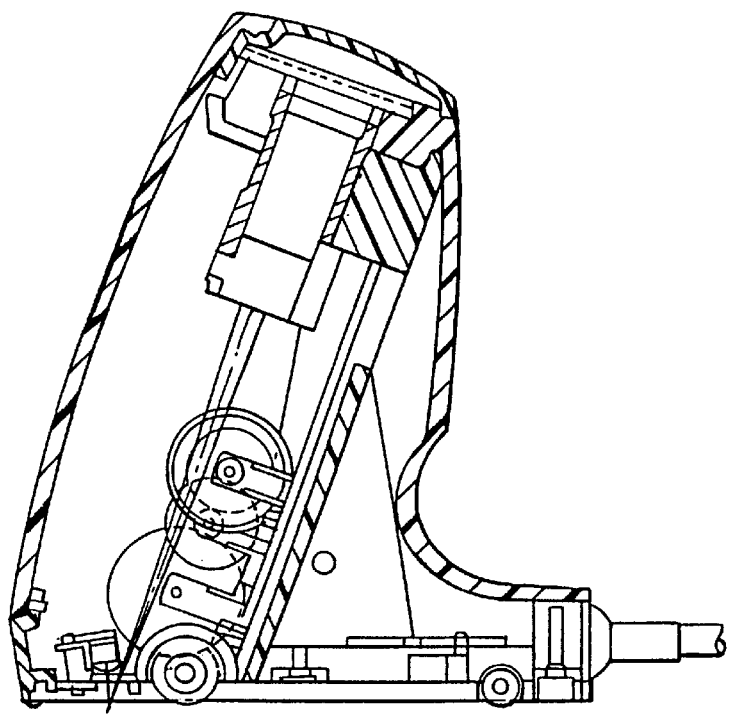

The front panel 14 extends between the side surfaces 18, 20 of the main grasping portion 10, the platform 16, and the bottom 18. The front panel 14 comprises a curved surface 27 which adjoins a flat surface 28 along a line 30 extending across the width of the front 14. A recess 32 is located in the near center of the curved surface 27 such that the user may easily place his thumb thereon when grasping the scanner 1, as shown in FIG. 3 The recess aids in showing the untrained user where to place his hand since it is natural to place the thumb in the recess 32, thus inducing the user to also place his index finger along the platform 16 and the remaining three fingers around the main grasping portion 10.

The flat surface 28 of the front portion 14 provides a straight front edge 34 which aids in alignment of the scanner 1 with the target bar code symbol 3 prior to scanning thereof Thus, although the scanner 1 features slightly curved surfaces and portions as described herein for various ergonomic advantages such as ease of grasping with the hand as well as aesthetic benefits, functional considerations such as the straight edge 34 for use with symbol alignment are also implemented.

The flat surface 28 of the front portion 14 has embedded therein a scanning indication window 36, which in the preferred embodiment is smoked or otherwise translucent plastic or glass. As will be described below, a light source which used to illuminate the target bar code symbol 3 also provides illumination through the window 36 for an easy-to-see visual indication that scanning is occurring. This visual indication is advantageously located at the very point where the user will necessarily be looking at the time that alignment has been achieved and scanning has begun. Prior art scanners typically utilize a small LED located in an inconvenient place on the scanner, thus requiring the user to look away from the point of alignment with the symbol for visual confirmation that the scanner has been triggered.

Figure 6A:
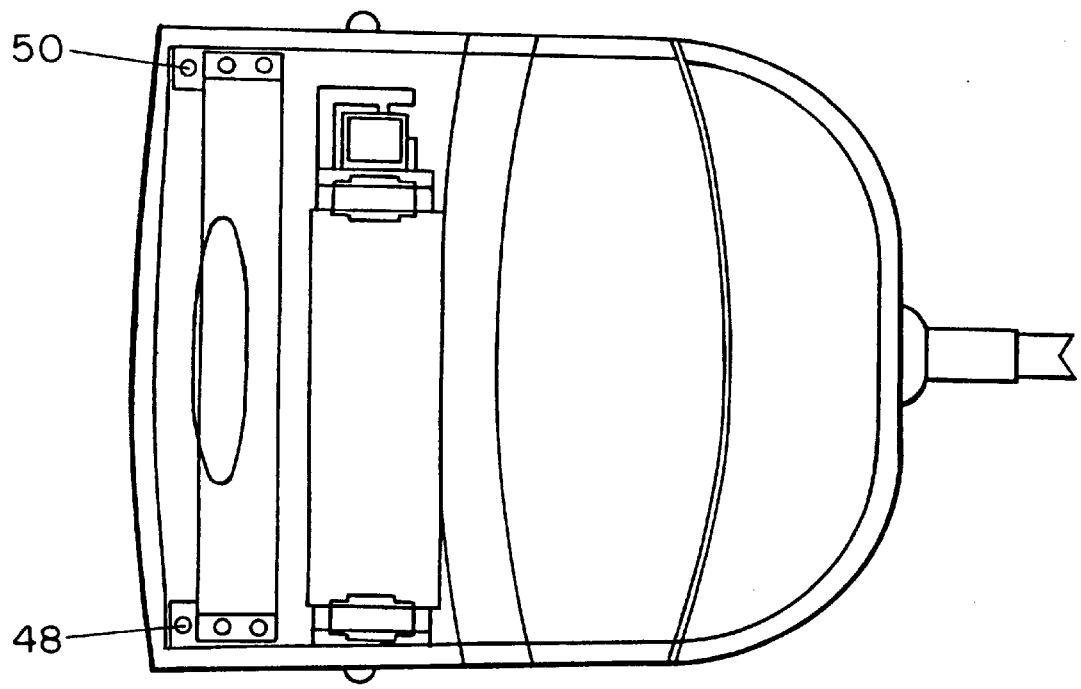
FIG. 6a and 6b are bottom plan views of thinning device of FIG. 1.
Figure 6B:
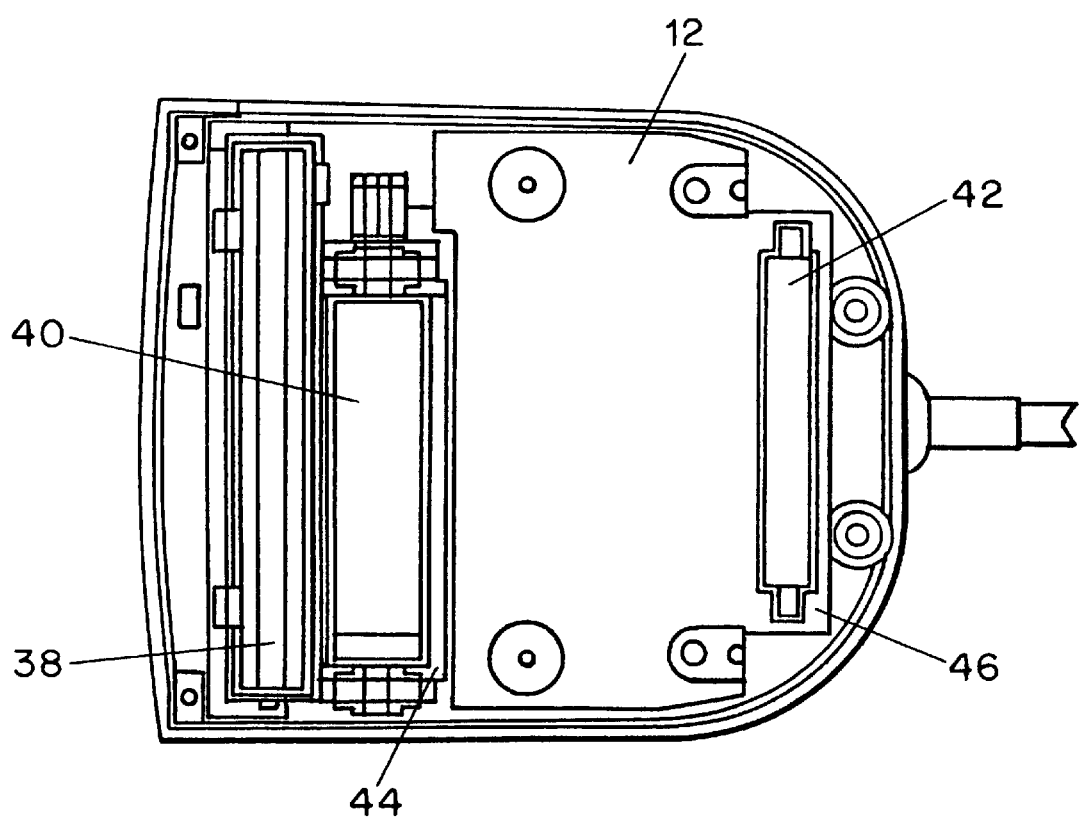
Figure 7:
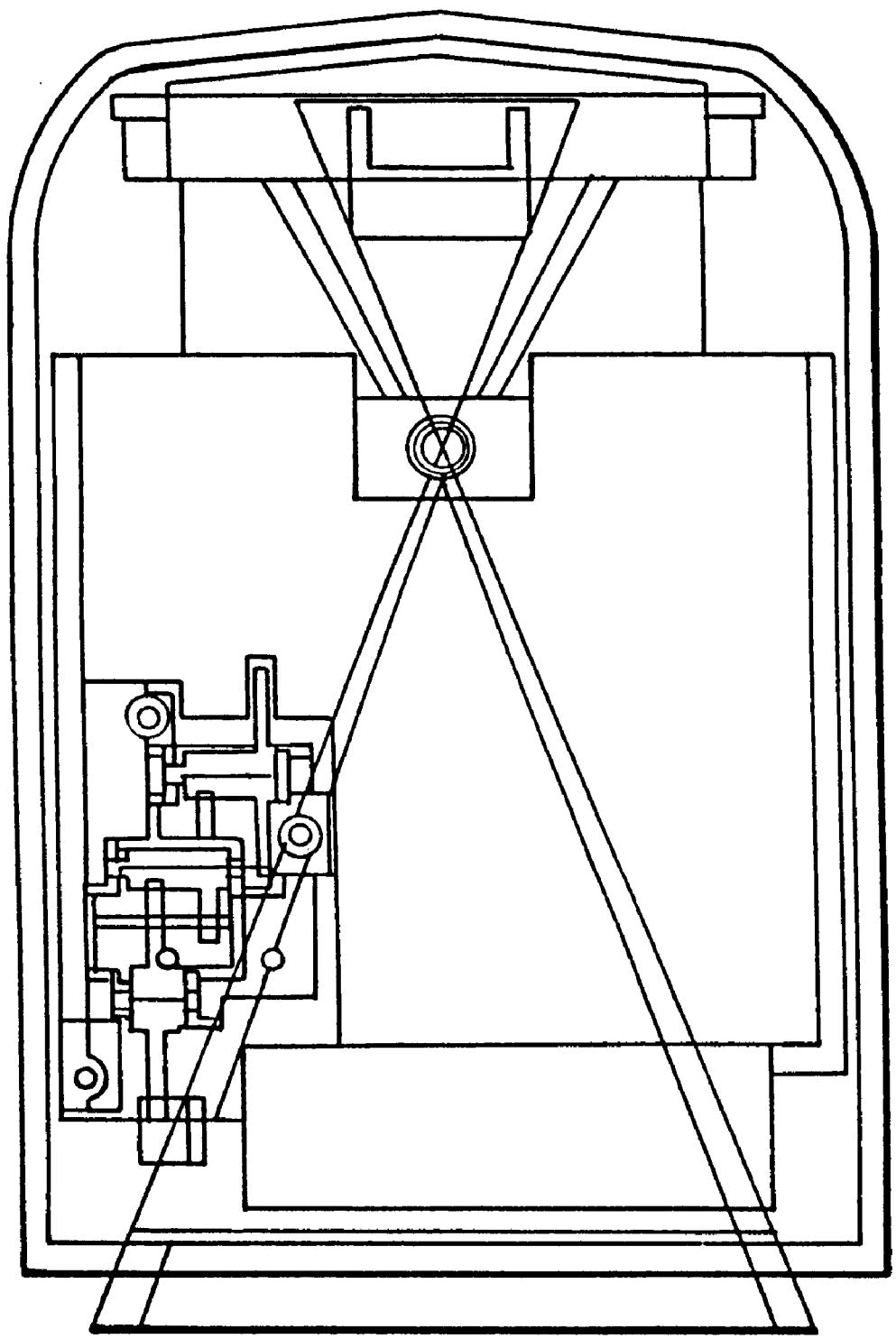
FIG. 7 is a front plan view of the scanning device of FIG. 1.

FIGS. 6i and 6b illustrate the bottom 12 of the housing 6. A symbol illumination window 38 is embedded near the front of the housing 6, which will allow illumination to exit from the scanner 1 as well as light reflected from the target bar code symbol 3 to enter for subsequent imaging. A first roller 40 and a second roller 42 extend through openings 44, 46., and provide for data clocking signals (as will be described below) as well as providing for lateral stability when the user is scanning over the bar code symbol.

A pair of spacing bumps 48, 50 are integrally molded into the bottom 12 near the straight edge 34 at the front of the scanner housing 6. The bumps are sized so that when the rollers 40, 42 of the scanner 1 are resting on a flat surface, the bumps will be just over but not touching the flat surface (approximately 0.002 inches from the flat surface in the preferred embodiment). The bumps function to keep flat a non-flat substrate such as a curled sheet of fax paper so that the target symbol thereon remains within the depth of field of the scanner 1.

Mounted within the inside of the housing 6 is an LED array 52 which is positioned slightly to the front of and over the illumination window 38 in order to provide illumination therethrough and onto the target bar code symbol 3. Also mounted within the housing 6 is the inner mounting frame 54, which comprises a printed circuit board 56, a clocking gear assembly 58, and an optical assembly 60.

The clocking gear assembly 58 provides rotational drive from the first roller 40 to is an associated sensor 63 located on the PC board 56. This type of rotational translation of energy is well known in the art and is used to provide timing information regarding the movement of the scanner to the control circuitry on the PC board. For example, the IMAGE ARTIST 800-DPI Hand-Held Scanner marketed by Mustek, Inc. implements such a gear assembly as may be used in the preferred embodiment of the present invention.

The optical assembly 60 used in the preferred embodiment is well known in the art and is fabricated from a lightweight, impact-resistant plastic material. The optical assembly comprises a focusing lens 62 and a linear CCD array 64, which comprises 2048 elements or pixels. The focusing lens 62 serves to focus an image of the target bar code symbol 3 onto the CCD array 64 for image capture and subsequent processing as desired. The juxtaposition of the optical assembly 60 within the housing 6 of the scanner 1 is arranged to provide a focused image at the plane located below the symbol illumination window 38. Sharp focus of the image of the bar code symbol 3 is critical in this contact scanning operation since the scanner 1 is capable of scanning and decoding high density PDF417 symbols.

Notably, in accordance with the present inventions, the optical assembly 60 is mounted on the inner mounting frame 54 in a substantially vertical position such that there is a direct, non-folded line of sight from the CCD array 64, through the lens 62, through the illumination window 38, and onto the target bar code symbol 3. This is obtained by mounting the optical assembly 60 near the top of the inner mounting frame 54 in a downwards direction such that the aforementioned alignment takes place when the inner mounting frame 54 is appropriately mounted within the housing 6. The inner mounting frame 54 provides a slight incline towards the rear of the housing 6.

Importantly, by providing a non-folded substantially vertical optical path, the present invention eliminates the need for a reflecting mirror, as is used in prior art CCD based scanning devices for bar codes and the like. Thus, problems associated with the use of reflecting mirrors in the prior art are obviated. In addition,. cost is reduced due to the elimination of the mirror from the assembly.

Moreover, in accordance with the present invention, by providing a substantially vertical optical path, the requirement for a scanner with a large footprint has been eliminated. Prior art scanners typically are approximately eight inches long, which disadvantageously takes up a lot of space. In an office environment, with which the present invention is advantageously implemented, the user benefits by the small footprint of the scanner of the present invention which results in part from the vertical optical path.

Figure 8:
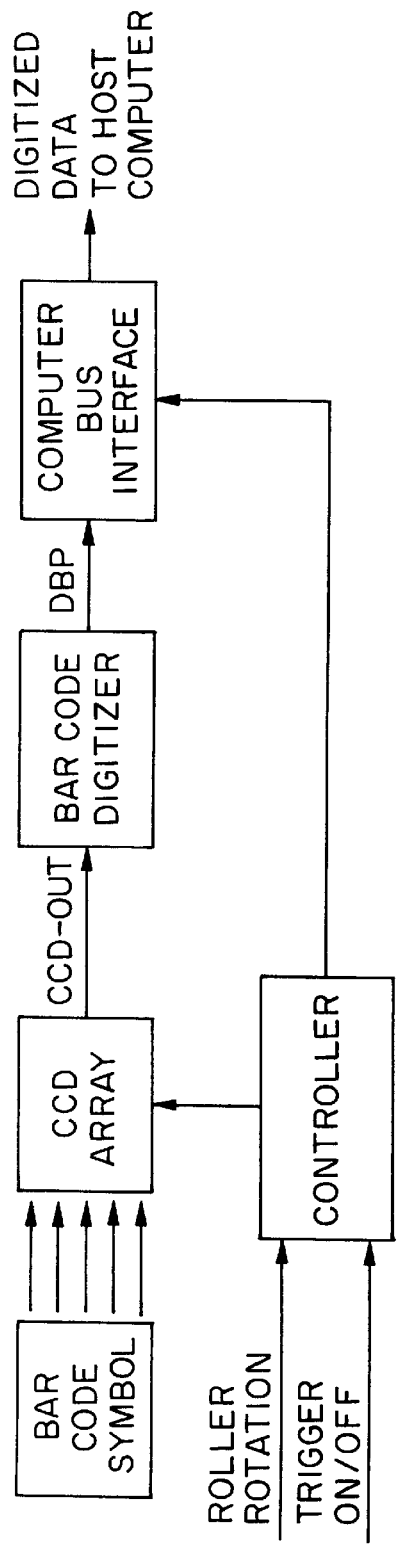
FIG. 8 is a functional block diagram of the scanning device of FIG. 1.
Figure 9:
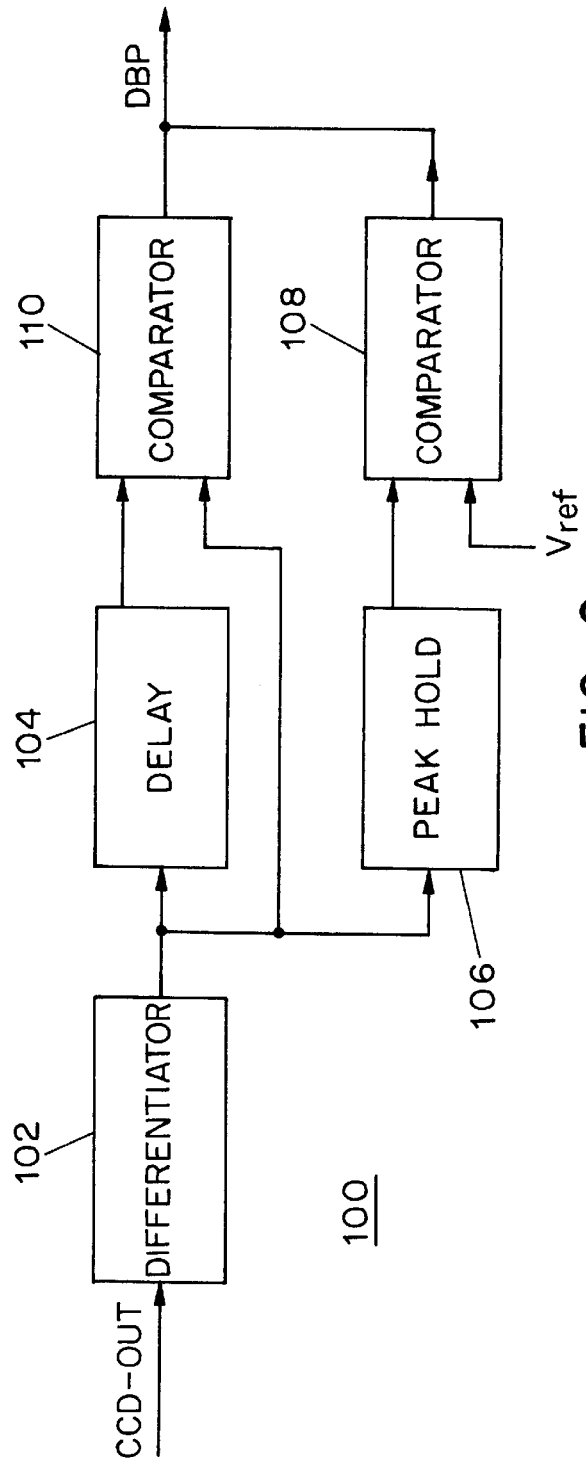
FIG. 9 is a block diagram of the bar code digitizer of FIG. 8.
Figure 10:
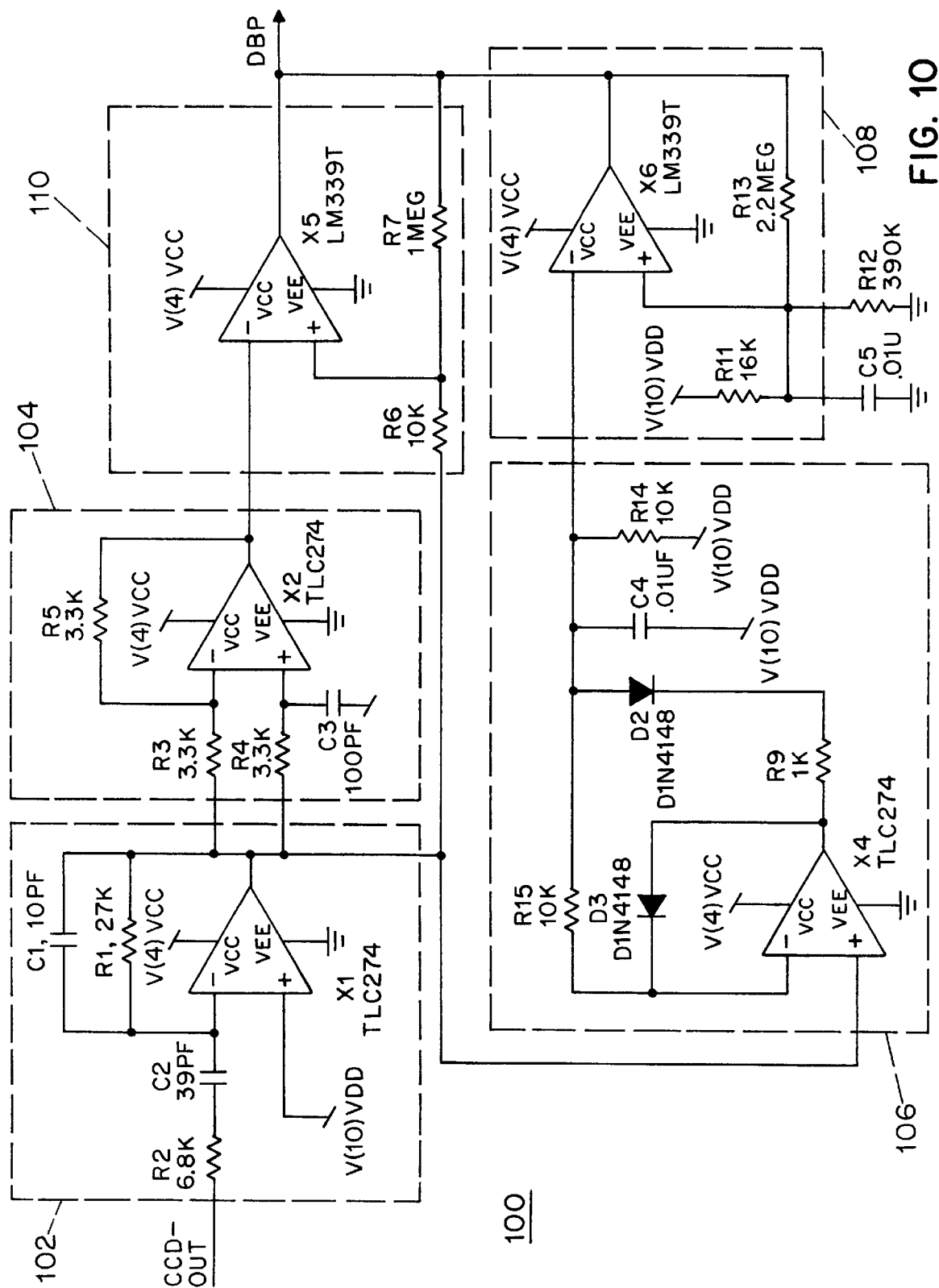
FIG. 10 is a detailed schematic of the bar code digitizer of FIGS. 8 and 9.

A functional block diag,ram of the scanner 1 of the present invention is shown in FIG. 8. The user will align the scanner 1 with the target symbol 3 as previously described, and depress the platform 16 to initiate scanning. The LED array 52 is activated and floods the target symbol 3 with light. The light reflected off the symbol 3 is focused onto the CCD array 64 by the lens 62. and the CCD array 64 generates an analog waveform with an amplitude proportional to the amount of light reflected from the symbol 3. The analog waveform CCD_OUT is output from the CCD array 64 as the symbol 3 is being scanned. CCD_OUT is input into a barcode digitizing circuit 200, which produces a digital bar pattern DBP. The digital signal DBP is then transmitted serially by an interface controller 202 to the personal computer 2 for storage in its memory and subsequent decoding.

The transfer of data out of the CCD array is controlled by the operation of the roller 40 in conjunction with the gear assembly 58 and the sensor 63 on the PC board 56 in accordance with techniques well known in the prior art.

In order to obtain successfully scan and decode a dense PDF417 symbol 3, the scanner 1 scans at a resolution of 800 dots per inch (dpi). Since prior art CCD page scanners typically collect data at a rate of approximately 200 scans/second, it would take a user approximately four seconds to scan down across a one inch long PDF417 symbol. This relatively long scan time of the symbol results in the user inadvertently misaligning the scanner 1 as he sweeps it down across the symbol, which ultimately results is misdecodes by the computer. Thus, in order to properly obtain the requisite amount of scan data for a dense PDF417 symbol 3, the scanner 1 of the present invention scans the symbol at the rate of 1000 scans/second, which results in a scan time of only 8 seconds for a one inch long PDF417 symbol.

Although optical page scanners of the prior art comprise circuitry for distinguishing between black and white by digitizing the scanned data in a "text scan" mode, the prior art circuitry is inadequate for use in scanning bar code symbols at the high rate of speed required by the present invention. Thus, the scanner 1 of the present invention advantageously implements the bar code digitizer circuit in order to provide a digital bar pattern from the CCD output at the high rate of scanning required. The block diagram of the bar code digitizer 100 comprises a differentiator 102, a delay circuit 104, a peak hold circuit 106, and comparators 108 and 110.

The analog waveform CCD_OUT output by the CCD array 64, the amplitude of which is proportional to the bars and spaces on the symbol 3, is input to the differentiator circuit 102. The differentiator circuit 102 generates a first derivative signal CCD_DERIV. The delay circuit 104 provides a delayed signal CCD_DERIV_DELAY to the comparator 110, which compares it with CCD_DERIV in order to determine with relative precision the location of the peak of CCD_DERIV. The comparator 110 also utilizes the CCD_DERIV peak information to toggle its output signal DBP whenever a peak is detected. Thus, the digital bar pattern encoded in the symbol 3 is replicated by the digital signal DBP.

In order to prevent noise present in the CCD output signal from falsely triggering DBP to toggle in between scans, the peak hold circuit 106 provides at its output a signal which is triggered by CCD_DERIV and decays slowly. During a scan operation, where the CCD is detecting a true bar and space pattern, the output of the peak hold detector circuit 106 will be continually triggered and remain higher than a preselected reference voltage Vref. During this time, the comparator 108 will output a low signal, thus allowing the DBP signal to toggle properly. However, when the true bar and space pattern is not present, the peak hold circuit output will decay to a value below the Vref threshold, and the comparator 108 will force the output signal DBP low, thus effectively filtering out any undesired noise in DBP.

The bar code digitizer circuit 100 thus operates to provide a digital bar pattern DBP from the CCD analog output a the high scan rate of 1000 scans/second in order to allow high speed scanning of the symbol 3 at the high resolution of 800dpi in accordance with the present invention. The user may the advantageously scan a dense PDF417 symbol 3 at a faster rate of speed than has heretofore been possible in the prior art.

Scanning of the bar code symbol by the scanner 1 is initiated by applying slight downwards pressure on the biased platform 16, which correspondingly depresses an internal switch to turn the scanner on. The LED array 52 is activated, an light illuminating therefrom causes the scanning indication window 36 to glow, thus providing a strong visual indication to the user that the scanner is on. The user aligns the front edge 34 with the top of the target symbol 3 (if not already aligned), and begins dragging the scanner 1 towards him over the symbol 3. The rows of the symbol which pass under the symbol illumination window 38 are illuminated, and the light reflected therefrom follows the vertical optical path through the focusing lens 62 and onto the surface area of the CCD array 64 for imaging as described above. Digitized data is input via a serial port through the cable 5 to the computer 2 for decoding.

Importantly, in accordance with the interface protocol of the present invention, the user does not have to execute a keyboard or mouse function in order to initiate scanning and decoding. The operating system and applications programs running in the computer 2 are configured so that the user simply activates the scanner and scans the symbol, and the data is automatically received by the computer, decoded, and loaded into the application the user is presently running. In contrast, prior art page scanning systems require the user to execute a scanning application and then press a key or click the mouse in order to allow scanning. The user must either then copy the scanned data to a disk file or directly to the desired application. This cumbersome and unwieldy method of scanning data is obviated by the present invention as will now be described.

In the preferred embodiment, the scanning interface is carried out under a Microsoft WINDOWS operating environment, which allows multiple programs to be executed in a multi-tasking mode. The decoding program is minimized and caused to run in a background mode. while the user then runs the desired application, e.g. a word processing program. When the user desires to import into the word processing application a text file which is encoded into a PDF417 symbol, the user simply scans the symbol as described above. The digitized data will be imported to the PDF417 decoding program, which decodes the data in real time to a text file. The decoded text file is then placed in the word processing program at the point selected by the user.

The PDF decoder software running under a WINDOWS environment provides the capability to decode the input data and import the decoded data to the desired platform. In the preferred embodiment, the PDF decoder conforms to the TWAIN interface, which is an industry standard interface between imaging software applications and imaging device hardware.

Data is transferred from the input cable 5, through a serial port in the computer, to a device driver, and then to a TWAIN compliant driver. The image data is the automatically ported to a TWAIN interface manager resident in the PDF417 decoder application, which feeds the image data to the application for decoding. After the image data is decoded under the PDF417 protocol, the decoded text is sent to the application being run by the user. Thus, data is scanned, imaged, digitized, ported, decoded, and input into the user's application by the user simply activating the scanner 1 and passing it over the target symbol.

Figure 11:
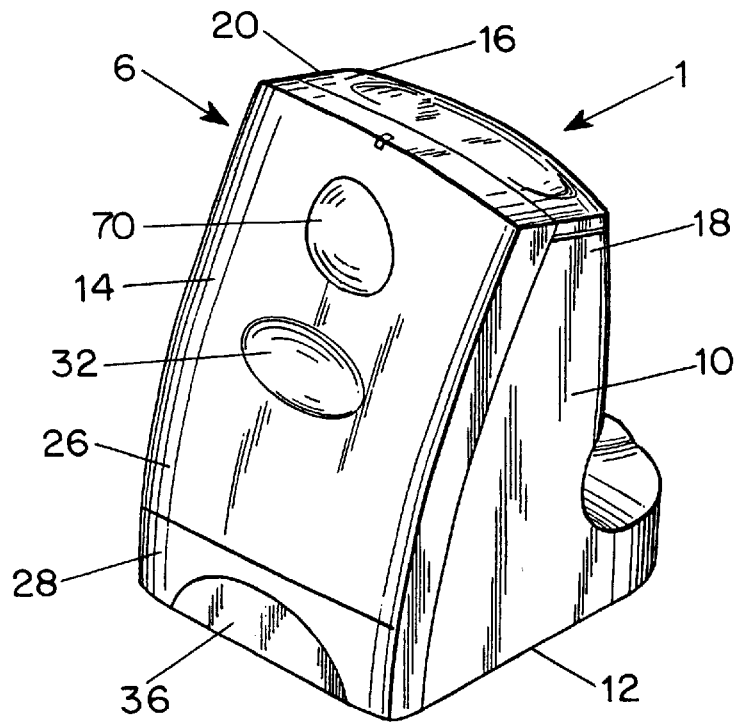
FIG. 11 is a perspective view of an alternative embodiment hand-held scanning device with a trackball and select buttons.
Figure 12:
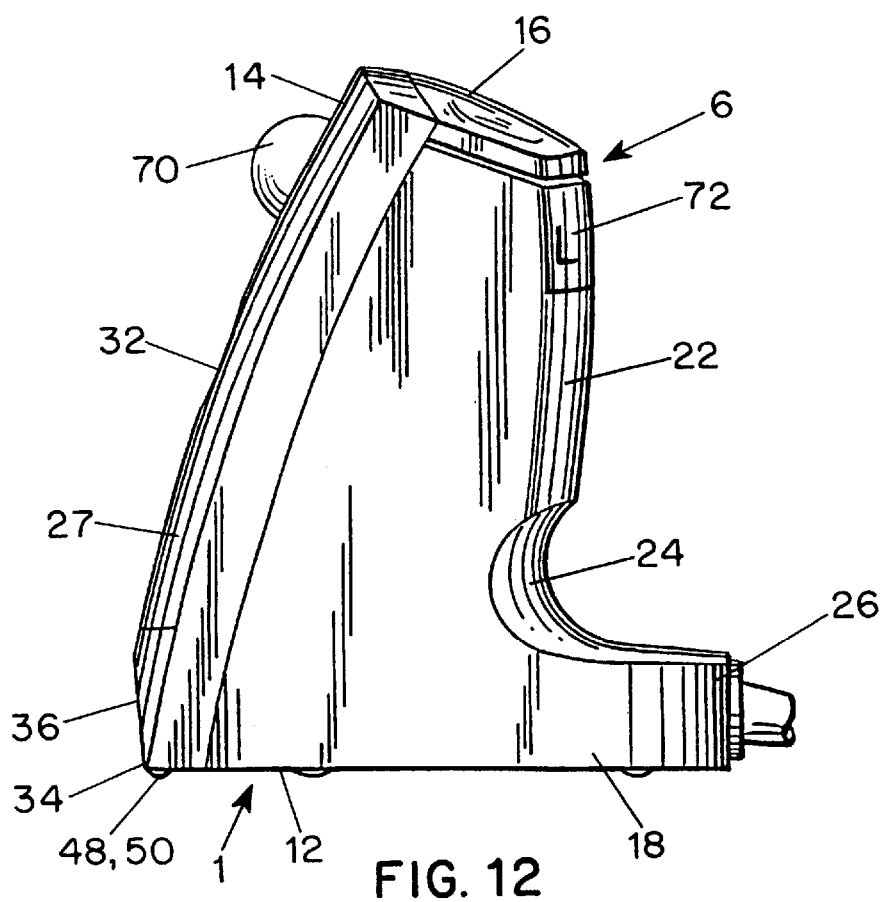
FIG. 12 is a side plan view of the scanning device of FIG. 11.
Figure 13:
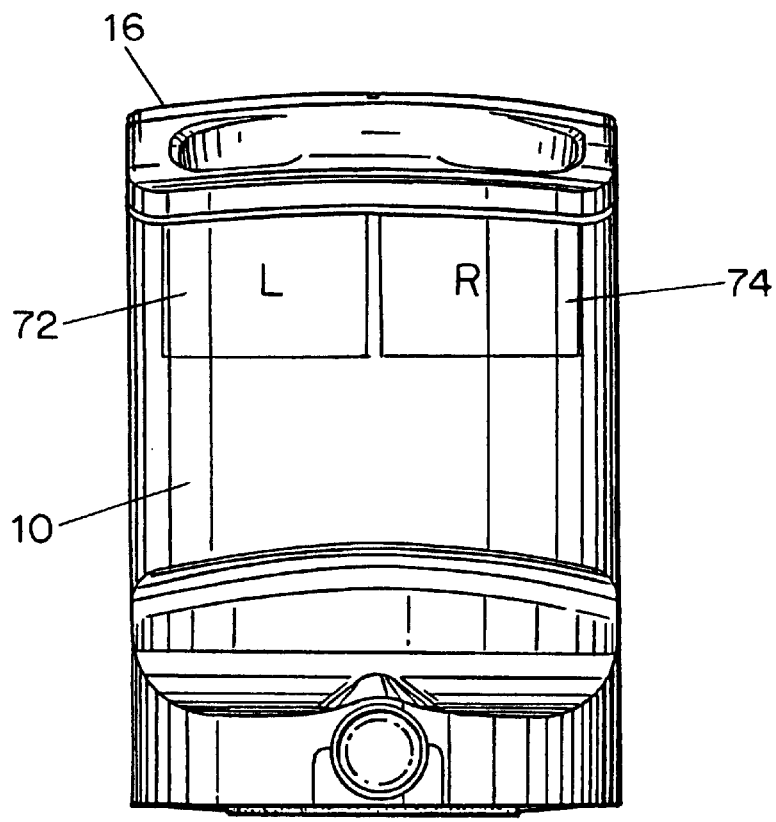
FIG. 13 is a rear plan view of the scanning device of FIG. 11.

FIG. 11 illustrates an alternative embodiment scanner 1*a* of the present invention in which the scanner 1 is adapted to house a trackball 70, a left mouse button 72, and a right mouse button 74. The trackball 70 provides cursor control functions by allowing the user to move the cursor on the screen by manipulating the trackball 70 as desired in accordance with means well known in the art. The left and right mouse buttons 72, 74 allow the user to click desired functions in the same manner as in the mouse and trackball devices well known in the art. The trackball 70 is located on the front panel 14 between the thumb recess 32 and the platform 16 to allow easy access thereof by the user when desired, yet to also allow the user to remove the thumb and place it on the recess for a firm grip of the scanner when scanning operations are desired. As shown in FIG. 13, the mouse buttons 72, 74 are located on the main grasping portion 10 so that the user may click on either button conveniently when desired, yet may remove his finger(s) from the buttons 72, 74 and place them firmly on the main grasping portion when it is desired to perform scanning operations.

Cursor control and button select information is processed and ported to the computer 10 via the cable 5 in accordance with techniques well known in the art to provide the control information to the application running. The scanner 1a is thus advantageous since it provides the multiple functions of symbol scanning and mouse or trackball control information to the computer in one small, lightweight device, which is connected to the computer at one serial data port. Moreover, the user need not have to physically switch between a mouse (or trackball) and the scanner when the different functions are desired; the user simply moves his thumb onto or off of the trackball as desired. In order to distinguish between the cursor control and button select signals and the image data provided during scanning, the scanner 1a defaults to a trackball/mouse mode, wherein the data transferred over the serial channel is ported to the appropriate application in the computer. When the user desires to scan a symbol, the scanning mechanism is activated by depressing the platform 16, which signals to the computer that ensuing data is image data and should be ported to the symbol decoder application. All data following is thus ported to the decoder until the user signals to the computer that scanning is complete by again depressing the platform, which signals to the computer that all ensuing data is trackball/mouse control information.

Although the preferred embodiments described herein implement a linear CCD array in order to scan the bar code symbol, it is to be understood that the invention is not limited to such embodiments. For example, in a further alternative embodiment of the present invention, the linear CCD array 64, rows 40, 42, and gear assembly 58 are eliminated, and a two-dimensional CCD is used to capture an entire symbol image without physically moving the scanner. Image data is shifted out of the 2D CCD array in accordance with well known techniques and digitized, transported to the computer and decoded as described above. In this alternative embodiment, the symbol illumination window 38 is enlarged to allow transmission therethrough of the entire symbol. In a further embodiment, a laser based scanning module is used instead of the linear CCD array to scan the symbol. As is well known in the art, such a laser based scanning module comprises a laser source such as a visible laser diode, a mechanical scanning component such as a mirror mounted on an oscillating motor, and a photosensor for receiving the reflected scanned beam from the target symbol.

Figure 14:
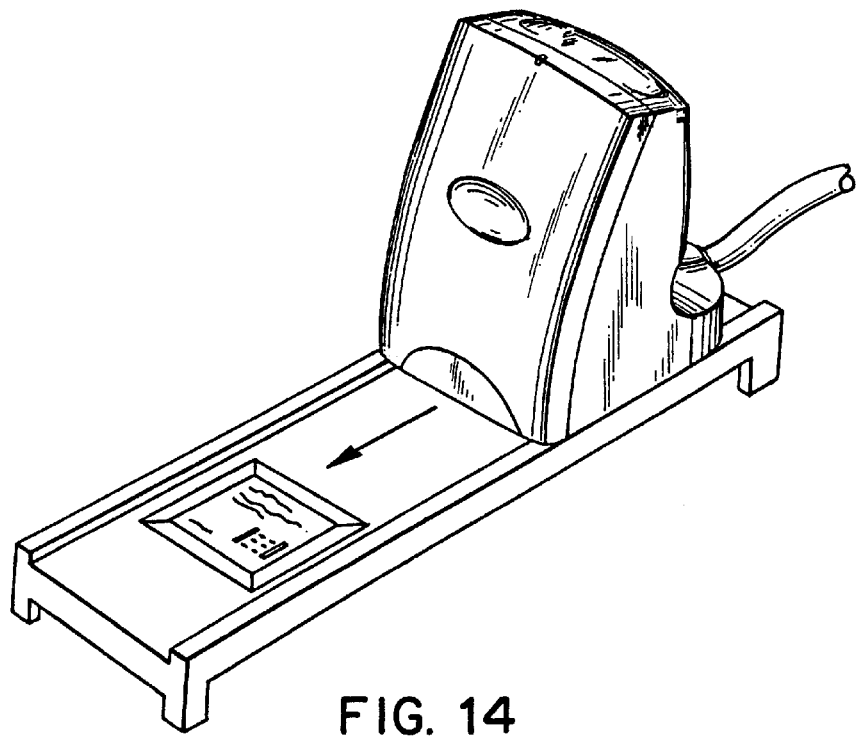

In a further alternative embodiment of the present invention, illustrated in FIG. 14, the scanner 1 of the present invention is used in conjunction with a mating card tray 80. This mode of operation of the scanner 1 allows the user to easily scan symbol located on small substrates such as business cards and the like. Attempting to hold onto the business card with one hand and roll the scanner 1 over the card can be unwieldy and difficult to maintain in constant alignment. By using the tray 80 of the present invention, the user simply snaps the scanner into a receiving portion on the tray 80, inserts the target card into the recess on the tray, and triggers and pulls the scanner over the card for scanning thereof The alignment of the card and the scanner 1 remains constant throughout the scanning operation, thus ensuring quick, accurate imaging and decoding of the target symbol. The tray 80 is fabricated from a lightweight resilient plastic material and takes up little space on the user's desktop.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is:

1. A lightweight, easy to grasp and manipulate hand-held optical scanning device for scanning and digitizing image data from a two-dimensional bar code symbol for subsequent decoding in a host computer, wherein said two-dimensional bar code symbol is encoded with data and comprises areas of different light reflectivity; said scanning device comprising:
   (a) a housing configured to be easily grasped by the hand of a user, said housing including:
      (i) a roller on a bottom portion thereof for allowing the optical scanning device to be placed on a substrate and rolled towards a user; and
      (ii) a front portion having a flat surface running along the width of said front portion and providing a substantially straight edge for alignment of said scanning device with respect to the bar code;
   (b) a symbol illumination window located on the bottom portion of the housing;
   (c) symbol illuminator located within the housing for providing flood illumination directly through the symbol illumination window and onto the symbol;
   (d) a solid state photosensor array for capturing thereon an image of at least part of the bar code symbol and producing analog waveforms with amplitudes proportional to the relative positions of the areas of different light reflectivity of the bar code symbol, said photosensor array positioned within the housing at an area located substantially over the symbol illumination window such that a substantially vertical optical path is defined by the symbol illumination window and the photosensor array;
   (e) a rotation detector, coupled to the roller, for detecting rotation of the roller and for controlling the photosensor array to output successive analog waveforms at predetermined intervals of rotation;
   (f) a digitizer for processing the analog waveforms and producing digital bar patterns corresponding thereto; and
   (g) a transmitter for transmitting the digital bar patterns to a host computer,
      whereby the digital bar patterns may be decoded by the host computer to produce a data file corresponding to the data encoded in the two-dimensional bar code symbol.

2. A lightweight hand-held optical scanning device for scanning and digitizing image data from a two-dimensional bar code symbol disposed on a substrate for subsequent decoding in a host computer, wherein said two-dimensional bar code symbol is encoded with data and comprises areas of different light reflectivity; said scanning device comprising:

(a) a housing configured to be ergonomically grasped by the hand of a user, said housing including:
  (i) a roller on a bottom portion thereof for allowing the optical scanning device to be readily moved on the substrate; and
  (ii) a front portion having a flat surface running along the width of said front portion and providing a substantially straight edge for alignment of said scanning device with respect to the bar code;
(b) a symbol illumination window located on the bottom portion of the housing;
(c) a symbol illumination source located within the housing for providing flood illumination directly through the symbol illumination window and onto the symbol;
(d) an optical assembly including a solid state photosensor array for capturing thereon an image of at least part of the bar code symbol and producing analog waveforms with amplitudes proportional to the relative positions of the areas of different light reflectivity of the bar code symbol, said assembly positioned within the housing at an area located substantially over the symbol illumination window such that a substantially vertical optical path is defined by the symbol illumination window and said assembly;
(e) a rotation detector coupled to the roller for detecting rotation of said roller and for controlling said assembly to output successive analog waveforms at predetermined intervals of rotation;
(f) a digitizer for processing the analog waveforms and producing digital bar patterns corresponding thereto; and
(g) a data coupler for transmitting the digital bar patterns to a host computer, whereby the digital bar patterns may be decoded by the host computer to produce a data file corresponding to the data encoded in the two-dimensional bar code symbol.

3. The scanning device of claim 2, wherein said housing further comprises:

a) a grasping portion having a pair of oppositely disposed side surfaces joined by a rear surface, said grasping portion adapted for accommodating a middle finger, a ring finger and a pinkie finger of an operator; and
b) a platform portion adjoining said grasping portion for activation of said scanning device by an index finger of the operator;
  wherein said front portion is disposed next to said grasping portion said front portion adapted for accommodating a thumb of an operator.

4. The optical scanning device of claim 3, wherein said front portion further comprises a scan indication window for indicating to the operator the state of the scanning device.

5. The optical scanning device of claim 2, wherein said bottom portion further comprises a plurality of spacing bumps protruding toward the substrate for keeping the substrate in a proper form.

6. The optical scanning device of claim 2, further comprising a display cursor controller for controlling a cursor on a display when said scanning device is not used for scanning.

7. The optical scanning device of claim 6, wherein said display cursor controller comprises:

a) a cursor position controller for controlling a position of the cursor on said display; and
b) a selector for selecting an item on said display, said item associated with the cursor position controlled by said cursor position controller.

8. The optical scanning device of claim 7, wherein said cursor position controller comprises a tracking ball protruding from the scanning device housing.

9. The optical scanning device of claim 7, wherein said selector comprises a plurality of buttons.

10. The optical scanning device of claim 2, wherein said optical scanning assembly further comprises:

a) a lens assembly for focusing the image onto said solid state photosensor array.

11. The optical scanning device of claim 10, wherein said solid state photosensor array is a linear photosensor array.

12. A lightweight hand-held optical scanning device for reading an encoded data from a two-dimensional bar code symbol disposed on a substrate, wherein said two-dimensional bar code symbol comprises areas of different light reflectivity, said scanning device comprising:

(a) a housing configured to be ergonomically grasped by the hand of a user, said housing including
  (i) a roller on a bottom portion thereof for allowing the optical scanning device to be readily moved on the substrate; and
  (ii) a front portion having a flat surface running along the width of said front portion and providing a substantially straight edge for alignment of said scanning device with respect to the bar code;
(b) a symbol illumination window located on the bottom portion of the housing;
(c) a symbol illumination source located within the housing for providing flood illumination directly through the symbol illumination window and onto the symbol;
(d) an optical assembly, including a solid state photosensor array for capturing thereon an image of at least part of the bar code symbol and producing analog waveforms with amplitudes proportional to the relative positions of the areas of different light reflectivity of the bar code symbol, said assembly positioned within the housing at an area located substantially over the symbol illumination window such that a substantially vertical optical path is defined by the symbol illumination window and said assembly;
(e) a motion detector coupled to the roller for detecting rotation of said roller and for controlling said assembly to output successive analog waveforms at predetermined intervals of rotation;
(f) a digitizer for processing the analog waveforms and producing digital bar patterns corresponding thereto; and
g) a decoder for decoding the digital bar patterns to produce a data file corresponding the data encoded in the bar code.

* * * * *